United States Patent
Joly et al.

(10) Patent No.: US 9,125,077 B2
(45) Date of Patent: Sep. 1, 2015

(54) METHOD FOR MANAGING POTENTIALLY DISRUPTIVE NODES IN A MOBILE AD-HOC NETWORK

(75) Inventors: Antoine Joly, Colombes (FR); Raphael Massin, Colombes (FR); Laurent Fachau, Colombes (FR)

(73) Assignees: THALES, Courbevoie (FR); INDRA SISTEMAS, Aranjuez (Madrid) (ES); ELEKTROBIT WIRELESS COMMUNICATIONS LTD, Oulu (FI); SELEX ES SPA, L'Aquilla (IT); SAAB AB, Jarfalla (SE); RADMOR SA, Gdynia (PL)

( * ) Notice: Subject to any disclaimer, the term of this patent is extended or adjusted under 35 U.S.C. 154(b) by 201 days.

(21) Appl. No.: 13/997,078

(22) PCT Filed: Dec. 21, 2011

(86) PCT No.: PCT/EP2011/073551
§ 371 (c)(1),
(2), (4) Date: Aug. 26, 2013

(87) PCT Pub. No.: WO2012/085057
PCT Pub. Date: Jun. 28, 2012

(65) Prior Publication Data
US 2014/0094205 A1    Apr. 3, 2014

(30) Foreign Application Priority Data

Dec. 23, 2010 (EP) .................................. 10290677

(51) Int. Cl.
*H04W 84/18* (2009.01)
*H04W 24/02* (2009.01)
(Continued)

(52) U.S. Cl.
CPC ............ *H04W 24/02* (2013.01); *H04W 40/246* (2013.01); *H04W 40/32* (2013.01); *H04W 84/18* (2013.01); *H04W 40/22* (2013.01)

(58) Field of Classification Search
CPC .............................. H04W 40/24; H04W 84/18
USPC ............ 455/501, 453, 452.2, 41.1, 41.2, 500, 455/515, 525, 67.11; 370/329, 338
See application file for complete search history.

(56) References Cited

U.S. PATENT DOCUMENTS

| | | | |
|---|---|---|---|
| 2003/0157951 A1* | 8/2003 | Hasty, Jr. ....................... | 455/519 |
| 2006/0280131 A1* | 12/2006 | Rahman et al. ............... | 370/256 |
| 2012/0020318 A1* | 1/2012 | Naoe et al. .................... | 370/329 |

OTHER PUBLICATIONS

Ece Gelal, et al., "An Integrated Scheme for Fully-Directional Neighbor Discovery and Topology Management in Mobile Ad hoc Networks", 2006 IEEE International Conference on Mobile Adhoc and Sensor Systems, Oct. 1, 2006, pp. 139-149, IEEE, XP031003827.

(Continued)

*Primary Examiner* — John J Lee
(74) *Attorney, Agent, or Firm* — Baker & Hostetler LLP

(57) ABSTRACT

A method for managing node communications in a mobile ad-hoc network is provided where at least a node in the said network performs the following steps: identifying if it is a Potentially Disruptive Node (PDN) or a non-PDN node, a PDN node being a node that has a number of connected 1-hop neighbor nodes greater than a predetermined value K; when the node is identified as a PDN node, selecting a subset of its 1-hop neighbor nodes, the selected nodes being the only 1-hop neighbor nodes that are allowed to communicate directly with the PDN node, the selected nodes being called Bridge Nodes (BN), non-BN nodes being called Regular Nodes (RN), the said RN nodes being able to communicate with PDN nodes via the selected BN nodes.

12 Claims, 4 Drawing Sheets

(51) Int. Cl.
*H04W 40/24* (2009.01)
*H04W 40/32* (2009.01)
*H04W 40/22* (2009.01)

(56) References Cited

OTHER PUBLICATIONS

Douglas M. Blough, et al, "The k-Neighbors Approach to Interference Bounded and Symmetric Topology Control in Ad Hoc Networks", IEEE Transactions on Mobile Computing, Sep. 1, 2006, pp. 1267-1280, vol. 5, No. 9, IEEE Service Center, Los Alamitos, CA, USA, XP001546033.

Tomas Johansson, et al., "Reducing Interference in Ad Hoc Networks Through Topology Control", Proceedings of the 2005 Joint Workshop on Foundations of Mobile Computing, Sep. 2, 2005, pp. 17-23, ACM, USA, XP001508060.

Xiang Yu, et al, "A Practical Low Interference Topology Control for Mobile Ad Hoc Networks", Sixth International Conference on Networking, Apr. 22, 2007, p. 23, IEEE, XP031214474.

* cited by examiner

METHOD FOR MANAGING POTENTIALLY DISRUPTIVE NODES IN A MOBILE AD-HOC NETWORK

CROSS-REFERENCE TO RELATED APPLICATIONS

This application is a National Stage of International patent application PCT/EP2011/073551, filed on Dec. 21, 2011, which claims priority to foreign European patent application No. EP 10290677.3, filed on Dec. 23, 2010, the disclosures of which are incorporated by reference in their entirety.

FIELD OF THE INVENTION

This invention relates to a method for managing potentially disruptive nodes in a mobile ad-hoc network, a node and a network. The invention is particularly, but not exclusively, applicable to ad-hoc networks.

BACKGROUND

A MANET network (Mobile Ad-hoc Network) is a kind of ad-hoc network that has the capability to reconfigure itself and change locations. Such a network is composed of a plurality of moving communication nodes that are able to receive/transmit data from/to each other.

In this specification the term node embraces equipments that can transmit and receive on a selected radio channel.

The term data embraces signalling or user traffic or any kind of traffic.

A MANET network can use a single radio channel or a plurality of radio channels. Data communications are usually transmitted in time slots, a time slot being defined by its transmission time and its duration.

A time slot used by a given node to transmit on a given radio channel can be reused in transmission on the same radio channel by other nodes if they are far away enough and thus do not interfere.

Several nodes belonging to a MANET network may have a negative impact on performances because of their wide connectivity compared to the network average. A node with a wide connectivity is a node that can communicate with many other nodes.

This is due to good propagation conditions and/or a favourable location of the node among other nodes in the network.

This kind of node is called potentially disruptive node (PDN node). For example, a node with a high altitude location may be considered as a PDN node.

The major concern about PDN nodes is linked to their large number of neighbours. Indeed, PDN nodes can reduce the amount of slot spatial reuse that could take place in a network if these PDN nodes were not present. Moreover, PDN nodes can become routing bottlenecks if they have to relay too much data.

In the article *position-based broadcast TDMA scheduling for mobile ad-hoc networks (MANETS) with advantaged nodes* written by K. Amouris, IEEE, October 2005, a solution to the problem of spatial reuse due to PDN nodes is proposed. In this article, PDN nodes are named advantaged nodes. Those nodes have a large transmission/reception range. Due to their increased number of neighbours, the amount of slot spatial reuse that can take place in a MANET can be significantly reduced. The proposed solution is based on the fact that each node in the network is equipped with a GNSS receiver or some other terrestrial coordinate system through Time of Arrival (TOA) measurements. A spatial grid is used, the said grid delimiting a virtual geographical zone, and each node of the network belongs to a square of that grid. This enables to utilize Spatial TDMA access type, which is the adaptation of TDMA for mobile ad hoc networks and slot spatial reuse. A disadvantage of this solution is that all the nodes of the network have to be equipped with a global navigation satellite system (GNSS). Moreover, the solution is not satisfying, as advantaged nodes only have one dedicated slot to transmit per transmission cycle and they have to share it on a round-robin basis. The limitation on the use of one slot for transmissions from advantaged nodes to non-advantaged nodes may create bottleneck situations.

SUMMARY OF THE INVENTION

According to the present invention there is provided a method for managing node communications in a mobile ad-hoc network where at least a node in the said network performs the following steps:
  identifying if it is a Potentially Disruptive Node (PDN) or a non-PDN node, a PDN node being a node that has a number of connected 1-hop neighbour nodes greater than a predetermined value K;
  when the node is identified as a PDN node, selecting a subset of its 1-hop neighbour nodes, the selected nodes being the only 1-hop neighbour nodes that are allowed to communicate directly with the PDN node, the selected nodes being called Bridge Nodes, non-BN nodes being called Regular Nodes, the said RN nodes being able to communicate with PDN nodes via the selected BN nodes.

For example, a node is identified as a PDN node if its number of 1-hop neighbours is $\alpha$ times greater than the mean number of 1-hop neighbours of its 1-hop neighbours, $\alpha$ being a predetermined real value with $\alpha>1$.

For example, the predetermined integer value K is chosen as $K \geq 3$.

According to a complementary aspect, PDN node identification and the BN nodes selection are performed periodically.

Preferably, the PDN node identification and the BN nodes selection are performed each time the number of 1-hop and/or 2-hop neighbours of a node is changing.

For example, a PDN node comes back to a non-PDN status if at least one of the two following conditions is not fulfilled:

$$T < K'$$

$$f = \frac{T}{M} < \alpha', \text{ with } \alpha' > 1$$

where:
  K' is a predetermined integer value that can be different from K with $3 \leq K' \leq K$,
  $\alpha'$ is a predetermined real value that can be different from $\alpha$ with $1 < \alpha' \leq \alpha$.

BN nodes are, for example, uniformly distributed in the mobile ad-hoc network.

According to a complementary aspect, BN nodes are selected so that a BN node has no BN node in its connected $\beta$-hop neighbourhood, $\beta$ being a configurable parameter.

BN nodes can be selected so that a Regular Node RN has at least one BN node in its connected $\beta$-hop neighbourhood.

According to the present invention there is also provided a node belonging to a mobile ad-hoc network comprising means to implement the method described above.

Preferably, the said node comprises a PDN Topology Control module, the said module being capable of making links between a PDN node and its RN nodes not allocable for data exchange, in order to decrease the high number of links allocable for data exchange between a PDN and its connected 1-hop neighbours.

According to the present invention there is also provided a mobile ad-hoc network comprising a plurality of nodes as described above.

Various further aspects and features of the invention are defined in the appended claims.

BRIEF DESCRIPTION OF THE DRAWINGS

Embodiments of the invention will now be described by way of example only with reference to the accompanying drawings in which.

DETAILED DESCRIPTION

Figure 1:
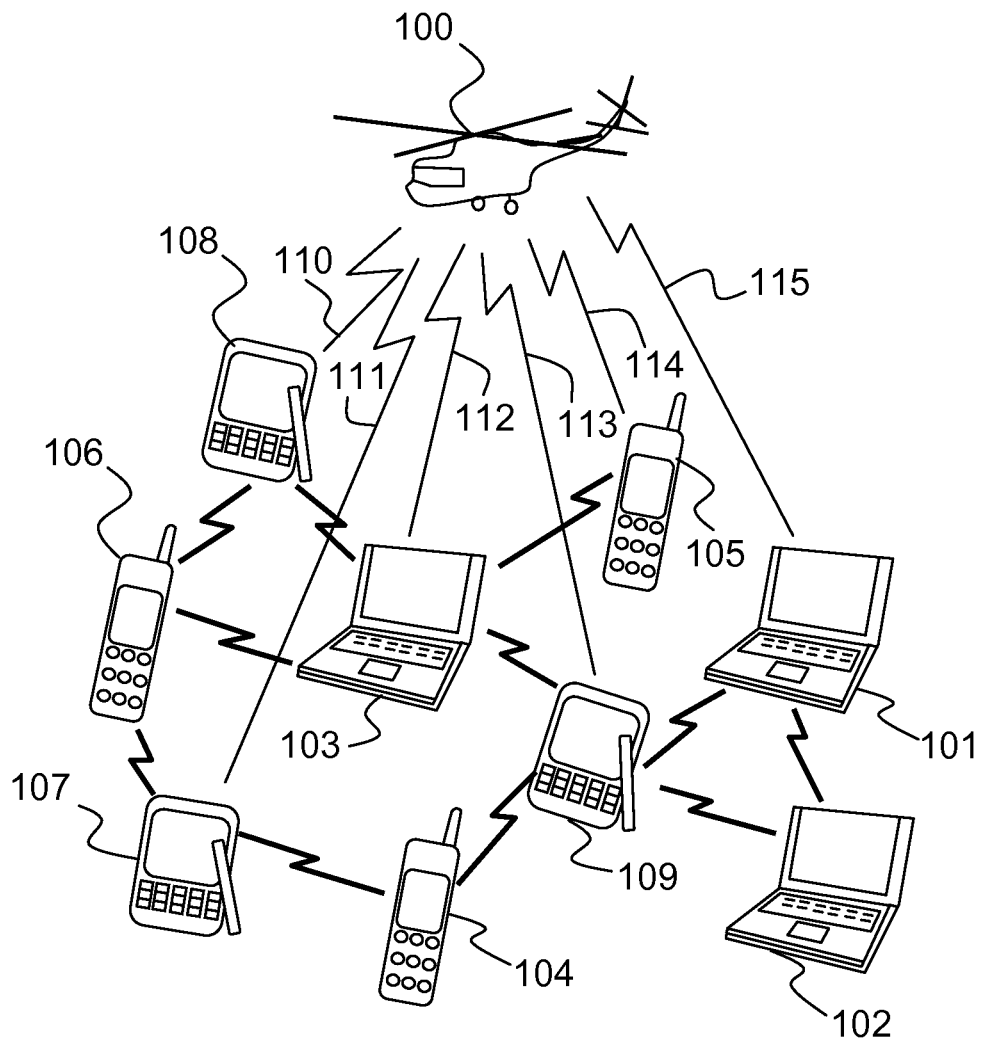
FIG. 1 is a schematic representation of a mobile ad-hoc network.

FIG. 1 is a schematic representation of a mobile ad-hoc network. This network comprises a plurality of nodes. These radiocommunications nodes are, for example, mobile phones 104, 105, 106, portable computers 101, 102, 103, electronic tablets 107, 108, 109 or unmanned aerial vehicle (UAV) 100. More generally, a node is an equipment that comprises means to transmit/receive data on a selected radio channel to/from other nodes of the network.

In the example of FIG. 1, the UAV 100 is able to transmit/receive data to/from 6 other nodes directly 101, 103, 105, 107, 108, 109. The neighbouring nodes that can be reached directly without the use of another node are called 1-hop neighbour node. A node that needs n relay nodes to be reached is called n-hop neighbour node.

The method proposed aims at identifying Potentially Disruptive Nodes (PDN), that have a negative impact on performances in MANET networks, because of a wide connectivity compared to the network average. Identified PDN nodes are then allocating a status to their neighbour nodes in order to optimize slot spatial reuse and routing in the network.

Thus, the proposed method comprises two steps: a first step aiming at identifying PDN nodes in the ad-hoc network and a second step aiming at optimizing slot spatial reuse and routing in the network.

The first step is described hereafter. For example, each node comprises means for self-identification. Those means allow a node to find out and decide itself if it is a PDN node or not.

The PDN identification step is based on the fact that a PDN node has many 1-hop neighbours and that a non-PDN node has less 1-hop neighbours than a PDN. In a preferred embodiment, a node needs to know its 2-hop neighbourhood in order to apply the method.

For example, a given node is identified as a PDN node if it fulfils one of the two conditions described hereafter. In a preferred embodiment, a given node is identified as a PDN node if it fulfils those two conditions together.

As an example, the first condition is that the node has at least K 1-hop neighbours, K being a predetermined integer value. This value can be chosen such as K≥3.

The second condition is, for example, that the node's number of 1-hop neighbours is α times greater than the mean number of 1-hop neighbours of its 1-hop neighbours, α being a predetermined real value chosen such as α>1. This second condition is useful in particular in high density networks as it allows identifying the most disruptive nodes.

In the sequel, $H_i$ designates the i-th 1-hop neighbour of node A, node A being a network node that estimates its status by using the proposed method.

The mean number M of 1-hop neighbours of the 1-hop neighbours of node A can be estimated by using the following expression:

$$M = \frac{\sum_{i=1}^{T} N_i}{T} \quad (1)$$

where:

T represents the number of 1-hop neighbours of node A;

$N_i$ represents the number of 1-hop neighbours of node $H_i$.

As explained previously, node A is identified as a PDN node, if the two following conditions are fulfilled:

$$T \geq K \quad (2)$$

$$f = \frac{T}{M} \geq \alpha, \text{ with } \alpha > 1 \quad (3)$$

On the contrary, a PDN node comes back to a non-PDN status if at least one of the two following conditions is not fulfilled:

$$T < K' \quad (4)$$

$$f = \frac{T}{M} < \alpha', \text{ with } \alpha' > 1 \quad (5)$$

where:

K' is a predetermined integer value that can be different from K. It can be chosen such as 3≤K'≤K;

α' is a predetermined real value that can be different from α. It can be chosen such as 1<α'≤α.

If parameters K' and α' are chosen such as K'=K and α'=α, there is no hysteresis. The advantage of having an hysteresis is that in this case, a node does not switch from the PDN to the non-PDN status and from the non-PDN to the PDN status too often in case of frequent neighbourhood changes. This is the case for example when K' and α' are chosen such as 3≤K'≤K and 1<α'≤α.

Figure 2:
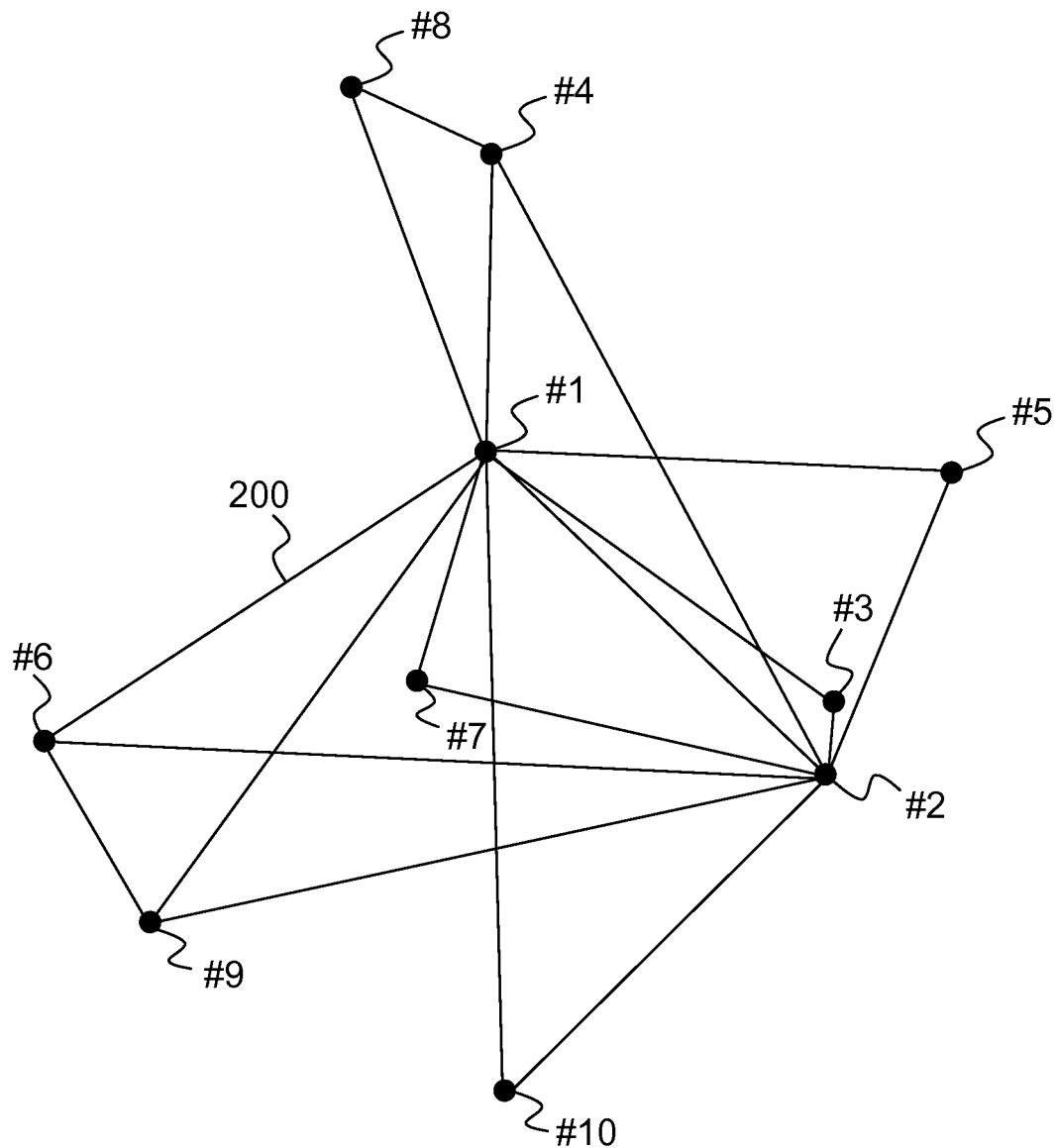
FIG. 2 is an illustration of how a PDN node is identified in an example of network topology.

FIG. 2 is an illustration of how a PDN node is identified in a given example of network topology.

The example of FIG. 2 comprises 10 nodes, each node being associated to a node identifier, a node identifier being here an integer comprised between 1 and 10. If two nodes are connected, namely they are able to communicate directly which means that they are within radio range, a straight line is drawn between them. For example, the two nodes associated with identifiers #1 and #6 are connected. Accordingly, a line 200 is connecting them.

Each node of the network will update its status, which means that it will determine if it is a PDN node or a non-PDN node. This update can be performed periodically. Alternatively, the status update can be performed each time the number of 1-hop or 2-hop neighbours is changing.

For each node of this network example, the identifier of 1-hop neighbours and the total number of its 1-hop neighbours are listed in table 1.

TABLE 1

1-hop neighbours

| Node id | 1-hop neighbours id | T (number of 1-hop neighbours) |
|---|---|---|
| #1 | #2, #3, #4, #5, #6, #7, #8, #9, #10 | 9 |
| #2 | #1, #3, #4, #5, #6, #7, #9, #10 | 8 |
| #3 | #1, #2 | 2 |
| #4 | #1, #2, #8 | 3 |
| #5 | #1, #2 | 2 |
| #6 | #1, #2, #9 | 3 |
| #7 | #1, #2 | 2 |
| #8 | #1, #4 | 2 |
| #9 | #1, #2, #6 | 3 |
| #10 | #1, #2 | 2 |

In this example, K and α are chosen as follows: K=3 and α=1.8. Node #1 will determine if it is a PDN node. It has 9 one-hop neighbours, so T=9. The mean number of 1-hop neighbours of its 1-hop neighbours is equal to:

$$M = \frac{\sum_{i=1}^{9} N_i}{T} = \frac{8+2+3+2+3+2+2+3+2}{9} = \frac{27}{9} = 3 \quad (6)$$

Accordingly the $f$ factor is equal to:

$$\frac{T}{M} = \frac{9}{3} = 3. \quad (7)$$

In this example, node #1 is identified as a PDN node because $f > \alpha = 1.8$.

By applying the same algorithm for the rest of the nodes, one obtains that node #2 is a PDN node and that nodes #3, #4, #5, #6, #7, #8, #9 and #10 are non-PDN nodes.

In a preferred embodiment, a node becomes a PDN node if the two aforementioned conditions are fulfilled for a predetermined duration.

Once a network node has become a PDN node, the network routing configuration is updated. This is the second step of the method according to the invention. PDN nodes are allowed to communicate in time slots only with a subset of selected nodes in order to decrease the high number of links between a PDN and its 1-hop neighbours. Those chosen nodes are called Bridge Nodes (BN nodes). A non-BN node is considered as a Regular Node (RN node) by the PDN node.

The aim is to improve the slot spatial reuse and thus the network capacity, and also reduce routing bottleneck issues on PDNs.

In order to summarize, a node can have three types of status:
 a node can have a Potentially Disruptive Node (PDN node) status;
 a node can have a Regular Node (RN node) status;
 a node can have a Bridge Node (BN node) status.

The PDN status has priority over the other statuses.

A RN node cannot communicate with a PDN node. Only a BN node can communicate directly with a PDN node.

When a node is switched on, it is initialized as a RN node.

The system works as described hereafter. Once a node has the PDN status, it decides which of its 1-hop neighbours are BN nodes.

In a preferred embodiment, BN nodes are uniformly distributed, so that RN nodes can reach PDN nodes through BN nodes more efficiently, with a known maximum number of hops.

Figure 3:
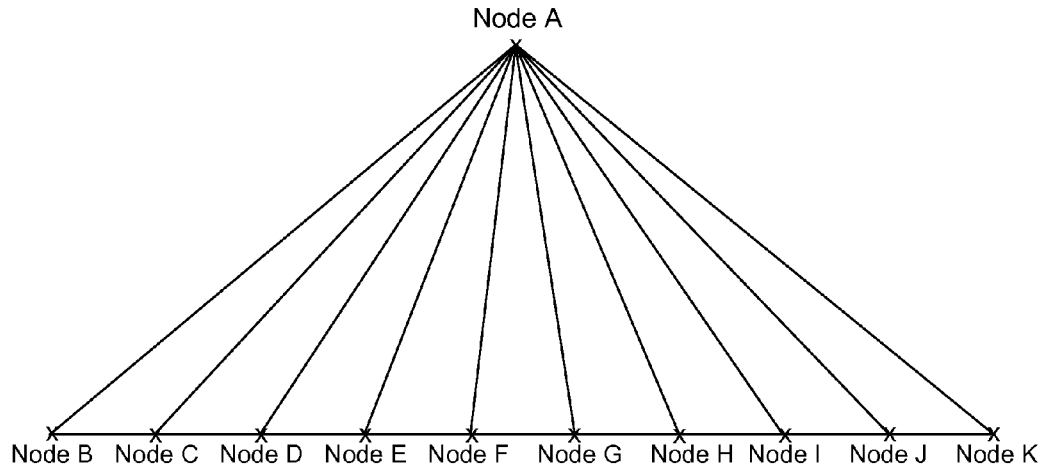
FIG. 3 shows an ad-hoc network configuration without using the invention.

FIG. 3 shows an ad-hoc network configuration without using the invention. This configuration comprises a node A that will be further identified as a PDN node and 10 other nodes B, C, D, E, F, G, H, I, J and K.

As explained previously, a PDN node is allowed to communicate only with some of its connected 1-hop neighbours, called Bridge Nodes, and is not allowed to communicate with the rest of its connected 1-hop neighbours, namely the RN nodes.

Each PDN node identifies its own BN and RN nodes. A PDN node comprises a PDN Topology Control module consisting into making links between a PDN node and its RN nodes not allocable for data exchange, in order to decrease the high number of links allocable for data exchange between a PDN and its connected 1-hop neighbours. It allows improving spatial reuse of time slots and data capacity. Additionally routing bottleneck issues can be solved, in particular for small size networks.

PDN Topology Control can be performed only by PDN nodes. Additionally, PDN Topology Control only applies to links between a PDN and its connected 1-hop neighbours.

Each PDN identifies its own BN nodes and RN nodes, independently of the BN and RN nodes identified by other PDN nodes potentially present in the network. For example, this selection can be performed according to the two following rules:
 rule 1: a BN node cannot have a BN node in its connected β-hop neighbourhood;
 rule 2: each RN node has at least one BN in its connected β-hop neighbourhood.

The connected neighbourhood considered for these two rules is the one without PDNs. It means that, if two BN nodes are connected 2-hop neighbours through a PDN, it is not a violation of rule 1 when β=2.

β is a configuration parameter, which has an influence on the number of BN nodes determined by a PDN node. It is equal, for example, to 1 or 2.

It is interesting to note that if a node has two PDN nodes, PDN1 and PDN2, in its connected 1-hop neighbourhood, this node can be identified as a RN node by PDN1 and as a BN node by PDN2.

Moreover, if a node A is identified as a BN node by a PDN node and a connected 1-hop neighbour of node A is identified as a BN node by another PDN node, it is not a violation of rule 1.

Figure 4:
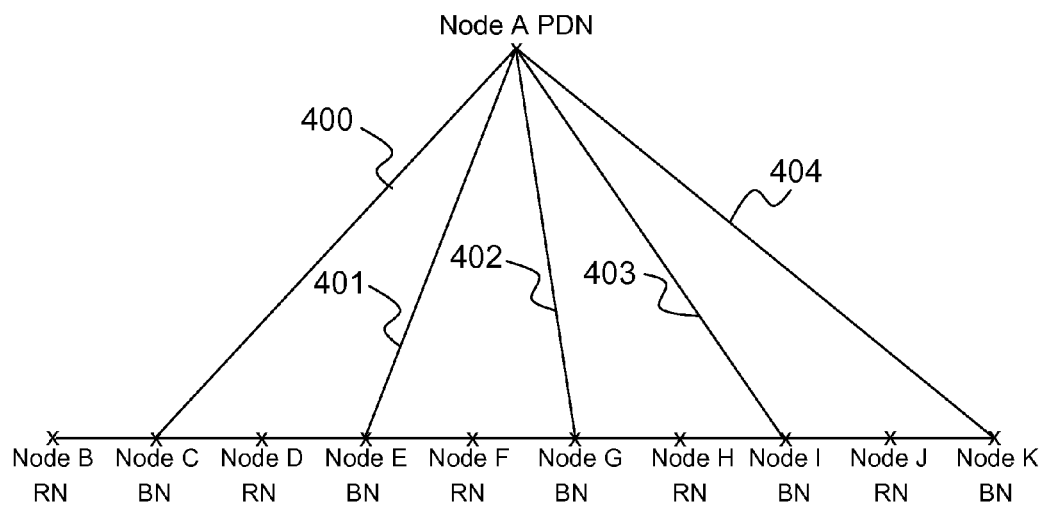
FIG. 4 shows the same ad-hoc network configuration with parameter β equal to 1.

FIG. 4 shows the same ad-hoc network configuration with β=1. It shows that 5 BN nodes C, E, G, I, K have been identified by the PDN node A. Thus, the other nodes B, D, F, H, J are considered as RN nodes. The BN nodes have the ability to transmit and receive data directly through the PDN node 400, 401, 402, 403, 404. However, the RN nodes do not have the ability to transmit and receive data directly through the PDN node. If a RN node needs to transmit data to or through a PDN node, it has to send its data to a BN node, directly or by using another RN node. As an example, if node F needs to transmit data to node A, it will use node E or node G to do that as they both have the BN node status.

Figure 5:
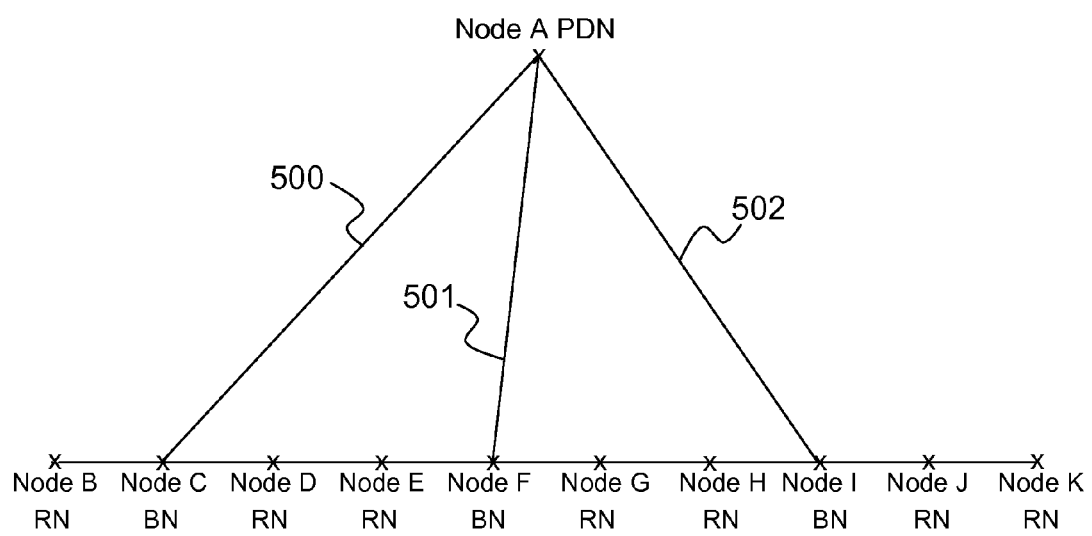
FIG. 5 shows the same ad-hoc network configuration with parameter β equal to 2.

FIG. 5 shows the same ad-hoc network configuration after applying the method according to invention with β=2. It shows that 3 BN nodes C, F, I have been identified by the PDN node A. Thus, the other nodes B, D, E, G, H, J, K are considered as RN nodes. The BN nodes have the ability to transmit and receive data directly through the PDN node 500, 501, 502. Compared to the example of FIG. 4, there are less connections between node A and other nodes. This is because β has been chosen as equal to 2.

The aforementioned rules 1 and 2 allow a PDN node to select its Bridge Nodes as uniformly distributed as possible in its connected 1-hop neighbourhood, so that its RN nodes can reach it (and vice versa) through its BN nodes more efficiently, with a known maximum number of hops. If, because of mobility for example, BN nodes are not properly distributed anymore, the PDN has to re-identify its BN nodes and RN nodes by using rules 1 and 2.

The methods, nodes and networks as described above and in the drawings are for ease of description only and are not meant to restrict the apparatus or methods to a particular arrangement or process in use.

The invention claimed is:

1. A method for managing node communications in a mobile ad-hoc network, wherein at least a node in the said network performs the following steps:
    identifying if it is a Potentially Disruptive Node (PDN) or a non-PDN node, the PDN node being a node that has a number of connected 1-hop neighbouring nodes greater than a predetermined value K, K being an integer of value 1 or greater;
    when the node is identified as the PDN node, selecting a subset of the 1-hop neighbour nodes, the selected nodes being only the 1-hop neighbour nodes that are allowed to communicate directly with the PDN node, the selected nodes being called Bridge Nodes (BN), non-BN nodes being called Regular Nodes (RN), the RN nodes being able to communicate with PDN nodes via the selected BN nodes.

2. A method according to claim 1, wherein a node is identified as a PDN node if its number of 1-hop neighbours is α times greater than the mean number of 1-hop neighbours of its 1-hop neighbours, α being a predetermined real value with α>1.

3. A method according to claim 1, wherein the predetermined integer value K is chosen as K≥3.

4. A method according to claim 1, wherein the PDN node identification and the BN nodes selection are performed periodically.

5. A method according to claim 1, wherein the PDN node identification and the BN nodes selection are performed each time the number of 1-hop and/or 2-hop neighbours of a node is changing.

6. A method according to claim 1 wherein a PDN node comes back to a non-PDN status if at least one of the two following conditions is not fulfilled:

$$T < K'$$

$$f = \frac{T}{M} < \alpha', \text{ with } \alpha' > 1$$

where:
    K' is a predetermined integer value that can be different from K with 3≤K'≤K;
    α' is a predetermined real value that can be different from α with 1<α'≤α.

7. A method according to claim 1, wherein BN nodes are uniformly distributed in the mobile ad-hoc network.

8. A method according to claim 1, wherein BN nodes are selected so that a BN node has no BN node in its connected β-hop neighbourhood, β being a configurable parameter.

9. A method according to claim 8 wherein BN nodes are selected so that a Regular Node RN has at least one BN node in its connected β-hop neighbourhood.

10. A node belonging to a mobile ad-hoc network, comprising means to implement the method according to claim 1.

11. A node according to claim 10, comprising a PDN Topology Control module, the said module making links between a PDN node and its RN nodes not allocable for data exchange, in order to decrease the high number of links allocable for data exchange between a PDN and its connected 1-hop neighbours.

12. A mobile ad-hoc network, comprising a plurality of nodes according to claim 10.

\* \* \* \* \*